United States Patent [19]
Choi

[11] Patent Number: 5,546,836
[45] Date of Patent: Aug. 20, 1996

[54] LATHE WITH AN AUXILIARY TRANSVERSE TABLE

[75] Inventor: Young S. Choi, Seoul, Rep. of Korea

[73] Assignee: Daewoo Electronics Co., Ltd., Seoul, Rep. of Korea

[21] Appl. No.: 269,384

[22] Filed: Jun. 30, 1994

[30] Foreign Application Priority Data

Jun. 30, 1993 [KR] Rep. of Korea .................. 93-12166

[51] Int. Cl.⁶ ..................................................... B23B 21/00
[52] U.S. Cl. .................. 82/132; 82/137; 82/141; 82/158; 82/163
[58] Field of Search ............................ 82/132, 137, 141, 82/158, 162, 163, 904

[56] References Cited

U.S. PATENT DOCUMENTS 2,792,872  5/1957  Wineka ............................ 82/162 X
3,731,566  5/1973  Kurimoto et al. ................... 82/162
3,935,766  2/1976  Masters ............................ 82/162
5,090,278  2/1992  Mair et al. ...................... 82/132 X
5,349,731  9/1994  Sheenhan et al. ................. 82/141 X Primary Examiner—S. Thomas Hughes
Attorney, Agent, or Firm—Nixon & Vanderhye P.C.

[57] ABSTRACT

A lathe includes an auxiliary transverse table at an opposite side to a transverse table. The auxiliary transverse table includes an auxiliary tool carrying an abrasive on one end thereof positioned at the opposite side to a machining tool of the transverse table. A workpiece is machined in a high straightness degree since the auxiliary tool of the auxiliary transverse table supports the workpiece on the opposite side to the tool of the transverse table which performs machining the workpiece. In addition, the machining time period as well as the number of machining processes on the workpiece can be reduced since the abrasive on one end of the auxiliary tool gives final touches to the workpiece during machining.

5 Claims, 2 Drawing Sheets

LATHE WITH AN AUXILIARY TRANSVERSE TABLE

BACKGROUND OF THE INVENTION

1. Field of the Invention

The present invention relates to a lathe, more particularly to a lathe with an auxiliary transverse table capable of machining a workpiece in a high straightness degree.

2. Description of the Prior Art

A lathe is a machine which can be used for machining a workpiece into a shape or for cutting the same as desired.

Generally, when a workpiece is machined into a predetermined shape by using a lathe, the workpiece is placed between a drive spindle and a tail stock of the lathe and then the workpiece is rotated by the drive spindle about its longitudinal axis. A turning tool or the like is fastened to the transverse table mounted on a cross table which turnig tool can be driven perpendiculary to the workpiece axis by the movement of the transverse table and can be driven parallel to the workpiece axis by the movement of the longitudinal table, so that a rotational machining of the workpiece can be accomplished in the conventional way.

U.S. Pat. No. 5,090,278 (issued to Hans Mair, et al.) discloses a lathe which can machine a workpiece with one transverse table at one side.

When machining a workpiece using the above conventional lathe, since the workpiece is machined by a tool at one side, the workpiece is subject to a loss of its straightness by its weight and by friction heat between the workpiece and the tool despite a coolant supplied therebetween.

Particularly, many difficulties in maintaining a straightness of the workpiece exist in a workpiece such as a long lead screw used for a disk player since it has a diameter much smaller than its length.

Therefore, there exists a problem in that it is difficult to machine a long workpiece in a high straightness degree at one time.

SUMMARY OF THE INVENTION

An object of the invention is to provide a lathe with an auxiliary transverse table capable of machining a workpiece in a high straightness degree as well as giving final touches to the workpiece during machining.

In order to achieve the above object, according to the present invention there is provided a lathe for machining a workpiece, the lathe comprising:

a drive spindle having a chuck for firmly clamping the workpiece at one end thereof and for rotating the workpiece;

a tail stock having a tail stock center for firmly supporting the workpiece at the other end thereof on an upper portion, and the tail stock being moved slidably in a logitudinal direction of the workpiece; and a machining table for machining the workpiece at one side and for supporting the workpiece at the other side, the machining table being moved slidably in the logitudinal direction during a machining operation.

In a preferred embodiment of the present invention, the lathe further comprises a cross table being moved slidably in the longitudinal direction for supporting the machining table and the machining table is moved in the longitudinal direction in accordance with the cross table. Additionally, the machining table may further comprise: a base having a transverse guiding protrusion thereon; a first wall having a first hole on an end of the base; a second wall having a second hole on the other ends of the base; a transverse table having a first groove at a lower portion thereof and being engaged with the transverse guiding protrusion on a first side of the machining table, for machining the workpiece, and the transverse table being moved slidably along the transverse guiding protrusion; an auxiliary transverse table having a second groove at a lower poriton thereof and being engaged with the transverse guiding protrusion on a second side of the machining table facing with the first side, for supporting the workpiece and the auxiliary transverse table being moved slidably along the transverse guiding protrusion; a first transverse lead screw connecting the first wall with the transverse table through the first hole and the first groove; and a second transverse lead screw connecting the second wall with the auxiliary transverse table through the second hole and the second groove.

It is preferred that the auxiliary tool bears an abrasive on one end thereof.

When using a lathe according to the present invention as mentioned above, the workpiece is machined in a high straightness degree since the auxiliary tool of the auxiliary transverse table supports the workpiece on the opposite side to the tool of the transverse table which performs machining the workpiece. In addition, the machining time period as well as the number of machining processes on the workpiece can be reduced since the abrasive on one end of the auxiliary tool gives final touches to the workpiece during machining.

BRIEF DESCRIPTION OF THE DRAWINGS

The above object and other advantages of the present invention will become more apparent by describing in detail a preferred embodiment thereof with reference to the attached drawings, in which.

DESCRIPTION OF THE PREFERRED EMBODIMENT

Now, the present invention will be explained in more detail with reference to the attached drawings.

Figure 1:
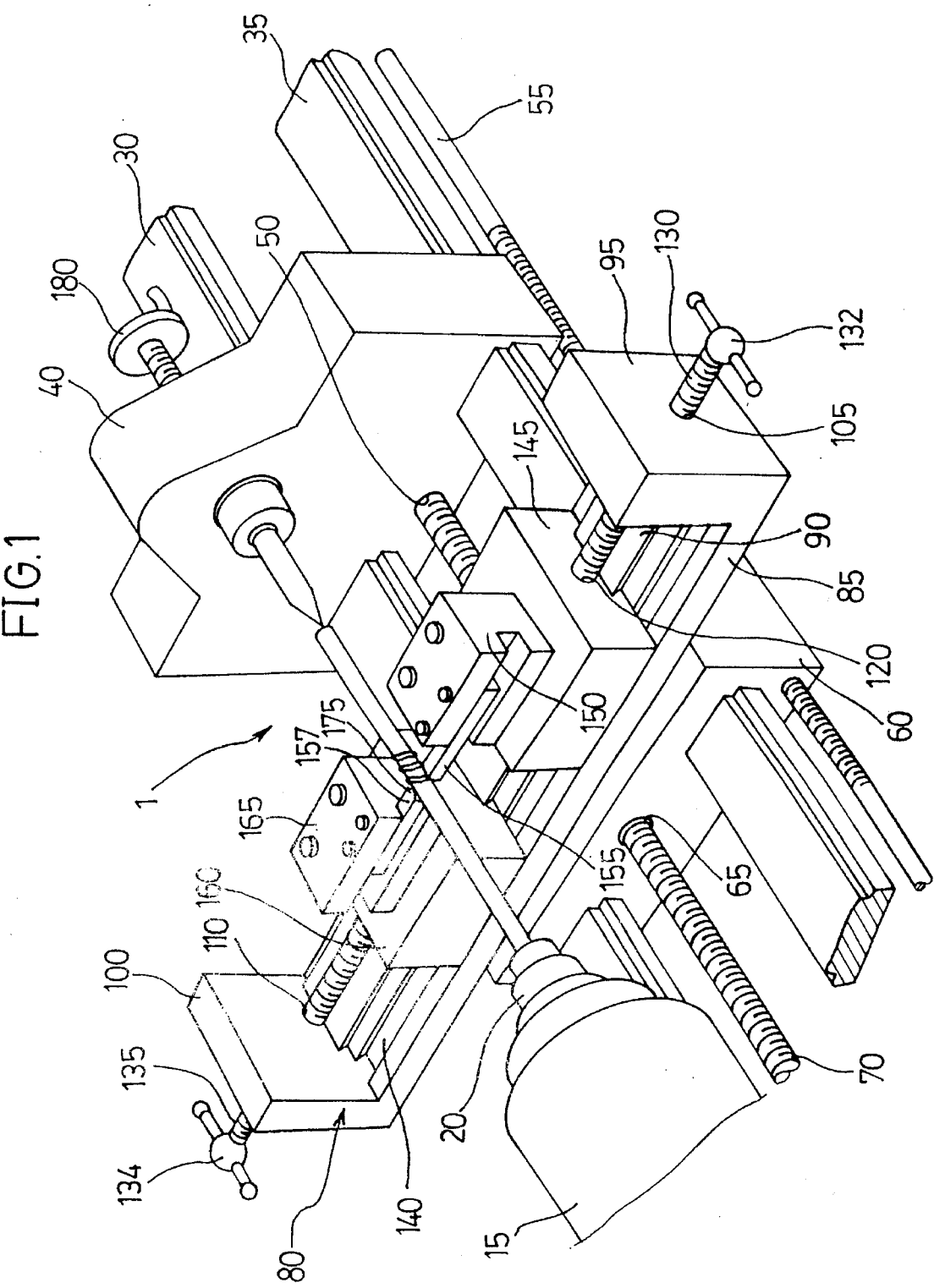
FIG. 1 is a partial perspective view of the main parts of the lathe with an auxiliary transverse table according to one embodiment of the present invention.
Figure 2:
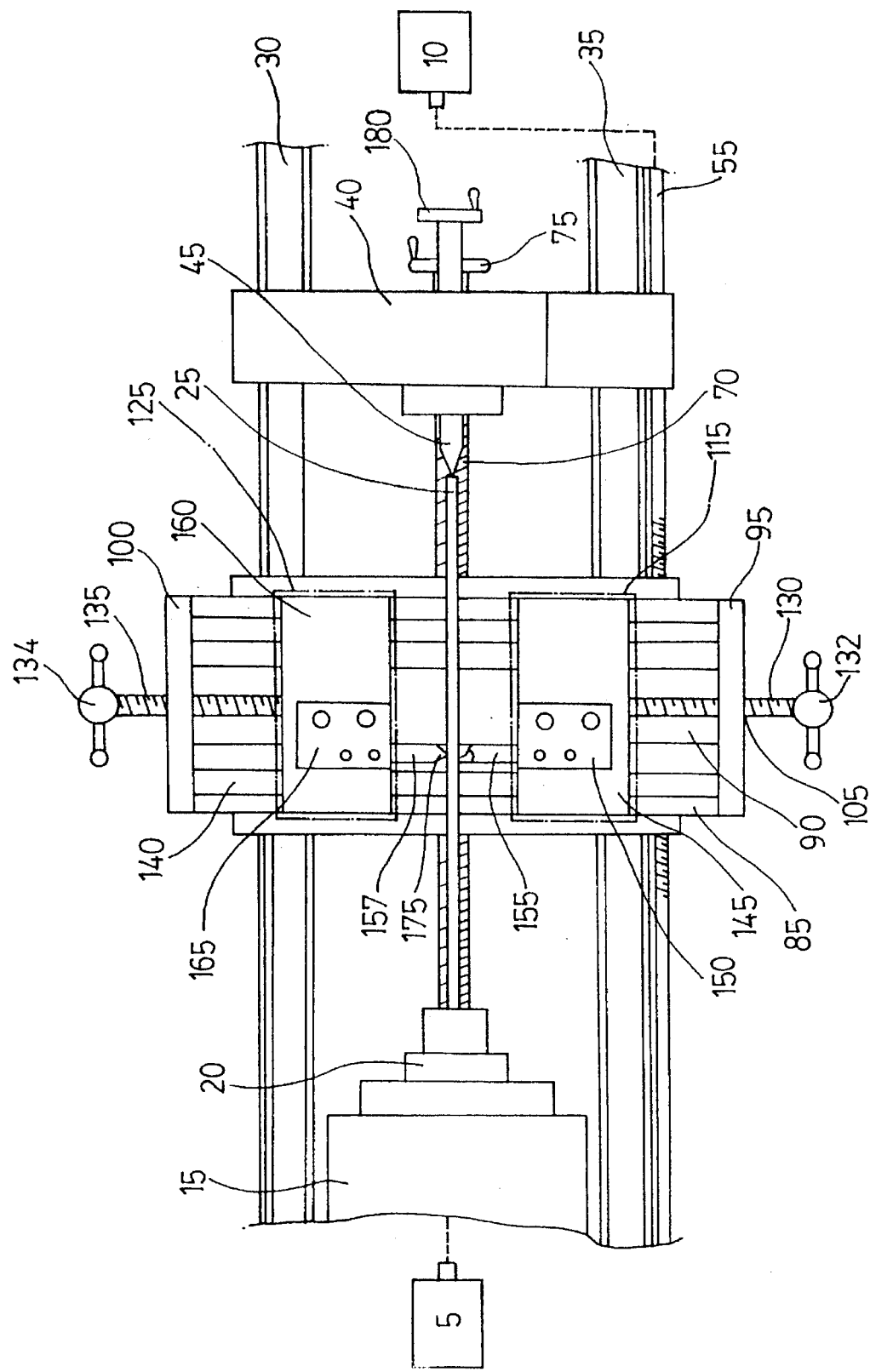
FIG. 2 is a plan view of FIG. 1 for illustrating the operations of the lathe as shown in FIG. 1.

FIG. 1 is a partial perspective view of the main parts of the lathe with an auxiliary transverse table according to one embodiment of the present invention and FIG. 2 is a plan view of FIG. 1 for illustrating the operations of the lathe as shown in FIG. 1. As shown in FIGS. 1 and 2, the lathe with an auxiliary transverse table according to the present invention includes motors 5 and 10.

A motor driven drive spindle 15 has a chuck 20 for firmly clamping by chuck 20 thereof and rotates a workpiece 25 to be machined.

Also included are a pair of longitudinal guiding bars 30 and 35.

A tail stock 40 has a tail stock center 45 on the upper part and a tail stock lead screw receiving portion 50 on the lower part and is slidably engaged with guiding bars 30 and 35 for firmly supporting by tail stock center 45 thereof workpiece 25 clamped by drive spindle 15 at one end of workpiece 25.

A motor driven longitudinal lead screw 55 arranged in parallel with guiding bars 30 and 35.

A cross table 60 has a tail stock lead screw receiving hole 65 at a proper position and is slidably engaged with guiding bars 30 and 35 and controlled in travelling by longitudinal lead screw 55.

A longitudinal tail stock lead screw 70 with a hand wheel 75 at one end thereof is mounted through receiving portion 50 of tail stock 40 and receiving hole 65 of cross table 60 in parallel to longitudinal guiding bars 30 and 35, and a machining table 80 is mounted on cross table 60 for machining and supporting workpiece 25 at one side and the other side respectively.

Machining table 80 includes a machining table base 85 having a transverse guiding protrusion 90 thereupon.

A pair of support walls 95 and 100 has formed on both ends of machining table base 85 and each has a lead screw receiving portion 105 and 110 at a proper position thereof.

A transverse table 115 is slidably engaged with transverse guiding protrusion 90 on one side of machining table 80 having a lead screw receiving groove 120 at a proper position for machining workpiece 25.

An auxiliary transverse table 125 is slidably engaged with transverse guiding protrusion 90 on the other side of machining table 80 and has a lead screw receiving groove (not shown but same as reference numeral 120) at a proper position, and a pair of transverse lead screws 130 and 135 is connected with walls 95 and 100 and transverse tables 115 and 125 at both sides through respective lead screw receiving portions 105 and 110 and grooves 120 respectively.

Machining table base 85 also includes a transverse groove 140 along transverse guiding protrusion 90 thereupon.

Transverse table 115 is constituted with a transverse slide 145 having lead screw receiving groove 120 at a proper position, and a toolholder 150 mounted on transverse slide 145 for fixedly receiving a tool 155.

Auxiliary transverse table 125 is constituted with a auxiliary transverse slide 160 having lead screw receiving groove (not shown but same as numeral 120) at a proper position and an auxiliary toolholder 165 mounted on auxiliary transverse slide 160 for fixedly receiving an auxiliary tool 170.

Auxiliary tool 170 bears an abrasive on one end 175 thereof.

Tail stock center 45 is equipped with a hand wheel 180 on one end thereof so as to be driven in and out.

The operation of the lathe having a construction as mentioned above will be described below in detail.

Workpiece 25 is provided between drive spinde 15 and tail stock 40 of lathe 1. One end part of workpiece 25 is firmly clamped in chuck 20 of drive spindle 15 and the other end of workpiece 25 is supported by tail stock center 45 of tail stock 40. When tail stock center 45 is positioned to support workpiece 25, hand wheel 180 can be used to drive tail stock center 45 in and out as well as hand wheel 75 fastened to longitudinal tail stock lead screw 70 can be manipulated to drive tail stock 40 itself in and out along the longitudinal guide bars in order to firmly support one end of workpiece 25.

Tool 155 is inserted and fixedly clamped in toolholder 150 of transverse table 115. When tool 155 is fixedly clamped, transverse lead screw 130, which screws support wall 95 and transverse slide 145 through transverse lead screw receiving portion 105 and transverse lead screw receiving groove 120, is manipulated with hand wheel 132 to move transverse slide 145 forwards and backwards for placing tool 155 at a suitable position in machining the workpiece 25. That is, transverse slide 145 is moved along transverse guiding protrusion 90 and transverse groove 140 formed on machining table base 85 by the manipulation of the hand wheel 132.

On the opposite side, the same procedures as above are performed to support workpiece 25. That is, auxiliary tool 157 is inserted and fixedly clamped in auxiliary toolholder 165 of auxiliary transverse table 125. When auxiliary tool 157 is fixedly clamped, auxiliary transverse lead screw 135, which screws support wall 100 and auxiliary transverse slide 160 through transverse lead screw receiving portion 110 and transverse lead screw receiving groove (not shown but same as numeral 120), is manipulated with hand wheel 134 to move auxiliary transverse slide 160 forwards and backwards for placing auxiliary tool 157 at the opposite position to tool 155 for supporting workpiece 25. That is, auxiliary transverse slide 160 is travelled along transverse guiding protrusion 90 and transverse groove 140 by the manipulation of hand wheel 134.

Transverse table 115 and auxiliary transverse table 125 mounted on machining table base 85 are formed of a machining table 80, together with walls 95 and 100 and transverse lead screws 130 and 135.

At the time, that is, when set up as above for machining workpiece 25, electric power is supplied to motors 5 and 10 which can be manually or automatically controlled as desired. Motor 5 drives drive spindle 15 for chuck 20 thereof to be rotated together with workpiece 25. Motor 10 is also driven for rotating longitudinal lead screw 55 firmly engaged therewith.

Cross table 60 is moved along longitudinal guide bars 30 and 35 at a proper speed according to the rotations of longitudinal lead screw 55 for displacing the machining and supporting positions of transverse table 115 and auxiliary transverse table 125 respectively which are mounted on cross table 60.

Auxiliary tool 157 carries an abrasive on one end 175 and moves along the machined part of workpiece 25 to thereby give final touches to workpiece 25 as soon as workpiece 25 is machined.

As described above, since a workpiece is supported all the time during machining by an auxiliary tool positioned at an opposite side to a machining tool, the workpiece is machined in a high straightness degree despite friction heat generated during machining between the workpiece and the machining tool. Also, since the auxiliary tool bears an abrasive on one end supporting the workpiece, a final touched workpiece can be obtained just when the machining on the workpiece is finished.

It is understood by those skilled in the art that the foregoing description is a preferred embodiment of the disclosed device and that various changes and modifications may be made in the invention without departing from the spirit and scope thereof.

What is claimed is:

1. A lathe for machining a workpiece, said lathe comprising:

a drive spindle having a chuck for firmly clamping said workpiece at one end thereof and for rotating said workpiece;

a tail stock having a tail stock center for firmly supporting said workpiece at the other end thereof on an upper portion, and said tail stock being moved slidably in a longitudinal direction of said workpiece;

a machining table for machining said workpiece at one side and for supporting said workpiece at the other side, said machining table being moved slidably in said longitudinal direction during a machining operation, said machining table further comprises:

- a base having a transverse guiding protrusion thereon;
- a first wall having a first hole on an end of said base;
- a second wall having a second hole on the other end of said base;
- a transverse table having a first groove at a lower portion thereof and being engaged with said transverse guiding protrusion on a first side of said machining table, for machining the workpiece, and said transverse table being moved slidably along said transverse guiding protrusion;
- an auxiliary transverse table having a second groove at a lower portion thereof and being engaged with said transverse guiding protrusion on a second side of the machining table facing with said first side, for supporting the workpiece and said auxiliary transverse table being moved slidably along said transverse guiding protrusion;
- a first transverse lead screw connecting said first wall with said transverse table through said first hole and said first groove; and
- a second transverse lead screw connecting said second wall with said auxiliary transverse table through said second hole and said second groove.

2. The lathe as claimed in claim 1, wherein said base includes a transverse groove along said transverse guiding protrusion.

3. The lathe as claimed in claim 1, wherein said transverse table comprises a transverse slide having said first groove and a toolholder mounted on said transverse slide for fixing a tool for machining said workpiece.

4. The lathe as claimed in claim 1, wherein said auxiliary transverse table comprises a auxiliary transverse slide having said second groove and an auxiliary toolholder mounted on said auxiliary transverse slide for fixing an auxiliary tool supporting said workpiece.

5. The lathe as claimed in claim 4, wherein said auxiliary tool bears an abrasive on one end thereof.

\* \* \* \* \*